United States Patent
Hannington

(10) Patent No.: US 6,896,757 B2
(45) Date of Patent: May 24, 2005

(54) REAR PROJECTION SCREENS AND LIGHT FILTERS WITH CONFORMABLE COATINGS AND METHODS OF MAKING THE SAME

(75) Inventor: Michael Hannington, Madison, OH (US)

(73) Assignee: Avery Dennison Corporation, Pasadena, CA (US)

( * ) Notice: Subject to any disclaimer, the term of this patent is extended or adjusted under 35 U.S.C. 154(b) by 6 days.

(21) Appl. No.: 10/702,824

(22) Filed: Nov. 6, 2003

(65) Prior Publication Data

US 2004/0099363 A1 May 27, 2004

Related U.S. Application Data

(63) Continuation of application No. 10/378,227, filed on Mar. 3, 2003, now abandoned, which is a continuation of application No. 09/780,744, filed on Feb. 9, 2001, now Pat. No. 6,695,453.

(51) Int. Cl.$^7$ .............................. B65C 1/17; B05D 5/06; B32B 33/00; G03B 21/60; G02B 5/128

(52) U.S. Cl. ....................... 156/230; 156/239; 156/247; 156/289; 422/148; 422/163.3; 422/164; 428/143; 428/195.1; 428/202; 428/207; 428/210; 428/914; 359/443; 359/453; 359/460; 359/537; 359/541; 359/614; 359/900

(58) Field of Search ................................ 156/230, 231, 156/232, 239, 241, 247, 289, 298; 427/146, 147, 148, 162, 163.3, 163.4, 164.105; 428/143, 195.1, 201, 202, 206, 207, 210, 914; 359/443, 452, 453, 460, 536, 537, 539, 541, 542, 613, 614, 900

(56) References Cited

U.S. PATENT DOCUMENTS

| | | | |
|---|---|---|---|
| 2,378,252 A | 6/1945 | Staehle et al. ............. 88/28.93 |
| 3,552,822 A | * 1/1971 | Altman ....................... 359/453 |
| 4,525,029 A | 6/1985 | Inoue et al. ................ 350/128 |
| 4,950,525 A | * 8/1990 | Bailey ......................... 428/164 |
| 5,563,738 A | * 10/1996 | Vance ......................... 359/614 |
| 5,760,955 A | 6/1998 | Goldenberg et al. ........ 359/456 |
| 5,781,344 A | * 7/1998 | Vance ......................... 359/614 |
| 5,858,139 A | 1/1999 | Ouderkirk et al. ............ 156/60 |
| 5,889,612 A | 3/1999 | Van De Ven ............... 359/453 |
| 6,051,318 A | 4/2000 | Kwon ......................... 428/413 |
| 6,076,933 A | * 6/2000 | DiLoreto et al. ........... 359/614 |
| 6,113,251 A | 9/2000 | Miyata ....................... 362/333 |
| 6,147,801 A | 11/2000 | Goldenberg et al. ........ 359/456 |
| 6,261,402 B1 | * 7/2001 | Watanabe et al. ........... 156/230 |
| 6,339,458 B1 | 1/2002 | Ohkawa ....................... 349/65 |

FOREIGN PATENT DOCUMENTS

| | | | |
|---|---|---|---|
| WO | WO96/30786 | * 10/1996 | ........... G02B/5/124 |
| WO | 99/50710 | 10/1999 | |
| WO | 00/69783 | 11/2000 | |

* cited by examiner

Primary Examiner—Jerry A. Lorengo
(74) Attorney, Agent, or Firm—Renner, Otto, Boisselle & Sklar, LLP

(57) ABSTRACT

This invention relates to light transmitting filters comprising: (a) a light absorbing layer of material having a front surface and a back surface, (b) transparent microspheres embedded in the light absorbing layer and contacting the front surface of the light absorbing layer with portions of the microspheres protruding through the back surface of the light absorbing layer for transmitting light through the light absorbing layer, and (c) a conformed layer of optically clear material having a front surface and a back surface wherein the front surface of the conformed layer is in contact with and conforming in shape with the protruding portions of the microspheres, and wherein the back surface of the conformed layer has a textured finish. The invention also relates to methods of making these light transmitting filters.

46 Claims, 3 Drawing Sheets

REAR PROJECTION SCREENS AND LIGHT FILTERS WITH CONFORMABLE COATINGS AND METHODS OF MAKING THE SAME

CROSS REFERENCE TO RELATED APPLICATIONS

This application is a continuation of U.S. application Ser. No. 10/378,227 filed on Mar. 3, 2003, now abandoned, which is a continuation of U.S. application Ser. No. 09/780,744 filed on Feb. 9, 2001, issued as U.S. Pat. No. 6,695,453.

FIELD OF THE INVENTION

The invention relates to rear projection screens and light filters, specifically those with a conformable coating over transparent microspheres.

BACKGROUND OF THE INVENTION

Rear projection screens transmit an image from the back of the screen to the viewer on the opposite side of the screen. The image is affected by the amount of light transmitted by the screen or filter or throughput. Generally, screens and filters have been limited by their construction to the amount of light transmitted through the screen or filter. It is desirable to have constructions which provide increased light throughput.

Generally, rear projection screens have suffered from poor angularity. Angularity is the term used to describe the ability of a viewer to see a good image from the screen or filter at some angles other than those which are ordinary to the screen surface. As the viewer moves to the side of the screen or filter, the image quality is decreased. It is desirable to have screens and filters which have improved angularity.

U.S. Pat. Nos. 5,563,738 and 5,781,344, (Vance), relate to light transmitting and dispersing filters having low reflectance. The multi-layer light filters use the addition of optical layers to a basic refractive light filter to allow adjustment of gain, contrast and ambient light rejection of light filters.

U.S. Pat. No. 6,076,933 (DiLoreto et al) describes light transmitting and dispersing filters similar to those described by Vance with the addition of a conformal layer of light transmissive material on the back surface of the transparent beads.

Rear projection screens typically contain mechanisms such as minute colloidal particles to diffuse the light into the desired viewing space. When these screens are used with high magnification systems in which the projection beam is nearly coherent, an undesirable artifact in the form of a speckle pattern (e.g., bright pin holes) often is observed. The speckle pattern is most pronounced in screens with high gains. Speckle reduction has been discussed in the literature. It is known for example that to reduce the visibility of speckle, the coherence of the illumination beam must be destroyed. One method which has been suggested is to move one diffusion screen with respect to another and separating the diffusing surfaces. When modifying the screens to reduce speckle, however, it is important not to deteriorate the resolution on the screen.

SUMMARY OF THE INVENTION

This invention relates to light transmitting filters comprising:
(a) a light absorbing layer of material having a front surface and a back surface,
(b) transparent microspheres embedded in the light absorbing layer and contacting the front surface of the light absorbing layer with portions of the microspheres protruding through the back surface of the light absorbing layer for transmitting light through the light absorbing layer, and
(c) a conformed layer of optically clear material having a front surface and a back surface wherein the front surface of the conformed layer is in contact with and conforming in shape with the protruding portions of the microspheres, and wherein the back surface of the conformed layer has a textured finish.

The invention also relates to methods of making these light transmitting filters. The light transmitting filters of the present invention have improved light throughput and improved angularity. The use of the light filters of the invention in rear projection screens substantially reduces speckle without materially affecting the percentage of light transmitted through the screen.

BRIEF DESCRIPTION OF THE DRAWINGS

FIG. 1b is an expanded view of a portion of FIG. 1a.

DETAILED DESCRIPTION OF THE PREFERRED EMBODIMENTS

Figure 1A:
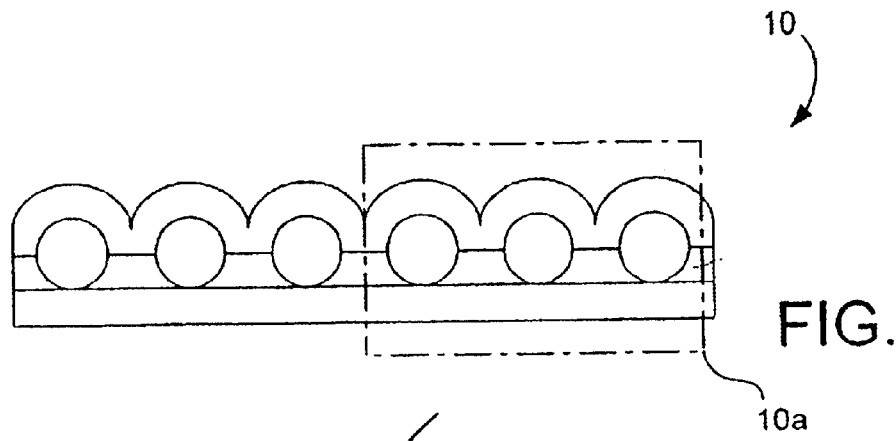
FIGS. 1a and 1b are cross sectional views of a light transmitting filter of the invention where

As used in the specification and claims, the phrase substantially uniform layer refers to a layer of the construction which has a thickness with little variance, such as a variation in thickness of less than about 5 microns, preferably a variation of less than about 2.5 microns, or preferably less than about 1.25 microns. The term conformed layer refers to a layer which conforms substantially in shape to the protruding portions of the microspheres. Here and elsewhere in the specification and claims, the range and ratio limits may be combined.

As described above, the present invention is directed to a light transmitting filter comprising:
a) a light absorbing layer of material having a front surface and a back surface,
(b) transparent microspheres embedded in the light absorbing layer and contacting the front surface of the light absorbing layer with portions of the microspheres protruding through the back surface of the light absorbing layer whereby the microspheres transmit light through the light absorbing layer, and
(c) a conformed layer of optically clear material having a front surface and a back surface wherein the front surface of the conformable layer is in contact with and conforming in shape with the protruding portions of the microspheres, and wherein the back surface of the conformable layer has a textured finish.

The light absorbing layer serves a number of purposes including fixing the beads, reducing the reflectivity of the light filter, and reducing the amount of light transmitted from the back surface through the interstices between the microspheres in the system to the viewer. This layer generally has a thickness sufficient for embedding the transparent microspheres. The embedding of the transparent microspheres may be at any level provided that the transparent microspheres form a light tunnel through the light absorbing layer. In one embodiment, the light absorbing layer has a thickness from about 10% to 90%, or from about 10% to about 80% of the transparent microsphere diameter. The light absorbing layer may be any material which is substantially opaque and can be embedded with the transparent microspheres to form light tunnels through the opaque layer. The light absorbing layer may be any material which is malleable enough to yield when the transparent microspheres are pushed against it, such as a partially or incompletely crosslinked urethane, a pressure sensitive adhesive, or with the addition of heat, thermoplastic polymers. The light absorbing material may also be a material which can form around the transparent microsphere, such as an asphalt or adhesive (a pigmented pressure sensitive adhesive).

Typically, the light absorbing layer is a combination of one or more pigments, usually carbon black, or other colorant, and one or more polymers, such as polyolefins, polyacrylates, polyvinyl acetals such as polyvinyl butyral, (e.g., Butvar resins available from Solutia), polyurethanes, polyesters or polyvinylcarboxylates. The polyolefins may be homopolymers and copolymers of $C_{2-12}$ olefins, such as ethylene, propylene, and butylene. The polyacrylates, including polymethacrylates, may be homopolymers or copolymer of $C_{1-12}$ acrylate or methacrylate monomers, such as methyl, ethyl, propyl, butyl, hexyl, or octyl acrylates or methacrylates. Here and elsewhere in the specification and claims, the term for pendant groups is meant to include all isomeric forms of the group. For instance, the use of the term octyl is intended to cover n-octyl, isooctyl, and 2-ethylhexyl groups. The polyvinylcarboxylates include homo or copolymers of $C_{1-12}$ vinyl carboxylates, such as vinyl acetate, vinyl propionate and vinyl butyrate. Examples of useful commercially available polyacrylates include Acrylic HI-7 from ICI and Acrylic MI-7 from Rohm & Haas. The light absorbing layer may contain from about 2% to about 10% by weight of the pigment and/or colorant.

Alternatively, the light absorbing layer may be a photosensitive film, in which case its optical density can be varied by exposure to actinic light. Photochromic materials which automatically adjust their absorption in response to ambient light conditions also can be used. In addition to film and polymer type materials, the light absorbing layer may be a wire mesh or perforated metal sheet, or a combination of wire mesh and polymers.

Transparent microspheres are embedded into the light absorbing layer. Typically the transparent microspheres are embedded to a level sufficient to provide light tunnels through the light absorbing layer. Light tunnels are present when the microspheres are embedded sufficiently into the light absorbing layer so that portions of the microspheres are in contact with, and in some instances, may perforate the front surface of the light absorbing layer, and other portions of the microspheres protrude through the back surface of the light absorbing layer. Generally, the transparent microspheres are embedded at a level of about 10% to about 80%, and in one embodiment, less than about 50% (preferably from about 30% to about 40%) of their diameter. The transparent microspheres generally have a refractive index from about 1.4 to 2.3, or from about 1.4 to about 2.2, or from about 1.45 to about 1.95. They are typically composed of glass, ceramic, plastic or other suitably transparent materials. The microspheres also may be composed of photochromic materials to allow their optical properties to respond to changes in incident light intensity. Alternatively, colored transparent microspheres may be used to allow chromatic effects. Transparent microspheres having an average diameter of from about 25 to about 300 microns are suitable for construction of the light filters described herein. In one embodiment, the transparent microspheres have a diameter of about 30 to about 120, or from about 40 to about 80, or from about 50 to 65 microns. In one embodiment, the diameter is an average diameter. In one embodiment, the transparent microspheres are substantially uniform in size. In another embodiment microspheres of different diameters can be combined in a light filter to increase the packing density. In some embodiments, it may be useful to use microspheres which are non-spherical in shape such as ellipsoids or rounded rods. These non-spherical shapes can be deposited in alignments that provide different optical properties in different directions. In another embodiment, the transparent microspheres are present in substantially a monolayer generally covering from 60% to about 91% of the surface area of the back surface light absorbing layer, or from about 75% to about 90%, or from about 85% to about 90% of the surface area of the back surface of the light absorbing layer.

The microspheres can be embedded in a close-pack array using a number of well known processes. In one method, a removable support material such as paper or a polymer film is coated with a thermoplastic resin binder layer which is modified by colorant to adjust the binder layer to the desired opacity. Microspheres are then spread over the resin binder layer which is subsequently heated, allowing the microspheres to be pressed into the resin binder layer until the microspheres contact the surface of the support material. The microspheres may be also deposited by electrophoresis from a fluid medium by spraying a mixture of microspheres, material for the binder layer and a solvent onto a support material, or by spraying microspheres directly onto a softened resin binder layer.

Another component of the light transmitting filter is the optically clear conformed layer. In one embodiment the conformed layer is substantially uniform in thickness. This layer typically has a thickness of about 10% to about 90% of the diameter of the average microsphere, or from about 20% to about 80%, or from about 30% to about 70% of the diameter of the average microsphere. In one embodiment, the conformed layer has an average thickness of from about 2.5 microns to about 270 microns. In another embodiment the thickness is from about 7.5 microns to about 75 microns. The conformed layer comprises any polymer which has the optical clarity needed for light transmitting filters. Typically these polymers are polyolefins, such as optically clear polyolefins from metallocene catalysts, polyacrylates, polymethacrylates, polycarbonates, polyurethanes, polyesters, such as polyethylene terephthates, polyvinylidene dichloride, cellophane, cellulose acetate, polyvinylidene difluorides, polyvinyl chlorides, polyvinyl acetals, and polyvinylcarboxylates. The front surface of the conformed layer is adhered to the back surface of the light absorbing layer and the microspheres which protrude from the back surface of the light absorbing layer.

In one embodiment, the light filter may have a tie layer to improve the adhesion of the conformed coating to the transparent microspheres and the light absorbing layer. This may be any material which improves this adhesion. Examples of suitable tie layer resins include "Platamid", available from Elf Atochem, "CXA", available from DuPont, and "Plexar" available from Chemplex. In another embodiment, the transparent microspheres and the light absorbing layer may be corona treated to improve the adhesion to the front surface of the conformed optically clear coating.

As noted above, the back surface of the conformed layer of optically clear material has a textured finish which results in reduced speckling. It is believed that the textured finish scatters reflected light with minimal effect on total light transmission thereby reducing speckling. In one embodiment, the textured finish may be a random microstructured surface such as a matte finish, or the finish may contain a pattern of three-dimensional microstructures having cross sections made up of very small circles, ovals, diamonds, squares, rectangles, triangles, polygons, lines, or irregular shapes when the cross section is taken parallel to the surface of the light absorbing material. The textured finish can be, in some instances, a holographic image embossed into the surface of the film. Several procedures and techniques are known to those skilled in the art for producing textured finishes on surfaces which can be used to form the textured finish on the back surface of the conformed layer. For example, the back surface of a conformable layer of optically clear material may be textured, prior to being conformed to the microspheres, by contact with a film or paper having a textured or matte finish. The finish on the film is replicated on the surface of the conformable layer when the two surfaces are joined by pressure. Alternatively the desired surface of the conformable layer deposited on, e.g., a release liner, can be textured by passing the construction through heated rollers, at least one of which has a textured surface. In another method, the image can be imparted to the back surface of the conformed layer by first printing an image or textured surface onto the face of a polymer coated surface of a casting sheet. The printing can be done using common printing techniques such as Flexography (Flexo) and Rotogravure (gravure). Heat and pressure are used to press the image into the face of the polymer coated casting sheet so that the top of the print is substantially level with the polymer coated surface. The conformable layer is then applied over the textured surface such as by lamination thereby replicating the textured or printed surface on the back surface of the conformable layer.

The conformed layer of optically clear material in one embodiment comprises a substantially uniform layer which has a thickness with little variance, such as a variation in thickness of less than about 10 microns, or even less than about 2.5 microns or even less than 1.25 microns. The conformed layer conforms substantially in shape to the protruding microspheres in the light absorbing layer. Thus, the conformed layer of optically clear material defines a plurality of lenses which are disposed on the back surface of a corresponding one of the microspheres and has a substantially spherical back surface with a radius of curvature somewhat larger than the radius of curvature of the microsphere.

The microspheres which protrude from the back surface of the light absorbing layer have a center of curvature, and the back surface of the conformed layer has a center of curvature. In one embodiment the center of curvature of the back surface of the conformed layer of optically clear material is behind the center of curvature of the microspheres, and this increases convergence of the light into the microspheres. In another embodiment, the center of curvature of the back surface of the conformed layer is about equal to the center of curvature of the microspheres thereby increasing convergences of light into the microspheres.

The conformed layer of optically clear material provides a preliminary stage of convergence of the light into the microspheres. Also, it is believed that positioning the centers of curvature of the back surface of the conformed layer behind the centers of curvature of the microspheres increases convergence of such light into the beads, and converges the light nearer the ideal angles for refraction of the light through the transmission areas in front of the microspheres.

In one embodiment, the front surface of the light absorbing layer may be supported by a an optically clear support layer to improve the sturdiness of the filter. The optically clear support layer may be a glass or a polymer. The support layer must resist the pressure exerted by the transparent microspheres during the embedding and conforming processes. The support layer may be adhered to the light absorbing layer by an adhesive, by lamination, or as a result of coextrusion. The support layer may be any material having sufficient strength to provide support to the light absorbing layer and having optically clear characteristics. Examples of support layers include glass, polyacrylics, polycarbonates, polyurethanes, such as two part polyurethanes, polyesters, such as polyethylene terephthalates, and any of the materials described above as useful in the conformed layer of optically clear materials.

The methods of making the light transmitting filters may be through heat lamination. In one embodiment it is desirable that a substantially uniform conformable layer is formed on the transparent microspheres. In one embodiment, it is desirable that the Vicat softening point of the polymer of the conformable layer is higher than the Vicat softening point of the polymer of the molding layer. The molding layer is in contact with the conformable polymeric layer during preparation of the light filter. The molding layer may be any thermoplastic polymer with the appropriate Vicat softening point. If the molding layer is composed of a polymer of similar nature to the conformable layer then a layer of silicone release layer, such as those used for pressure sensitive adhesive liners, may be used to enhance ease of separation of the layers. In one embodiment, the molding layer is composed of polyolefins, such as low, medium and high density polyethylene, propylene or mixtures thereof. The lower Vicat softening point of the molding layers helps form the conformable layer by softening and/or melting to conform to the surface of the transparent microspheres. Under the pressure and temperature of preparation, the molding layer presses the conformable layer against the transparent microspheres.

In one embodiment, the light filters of the invention can be prepared by the steps of (1) providing a first assembly comprising a light absorbing layer having a front surface and a back surface wherein the front surface is adhered to a removable substrate, and a monolayer of transparent microspheres embedded in the light absorbing layer, wherein the microspheres provide light tunnels through the light absorbing layer and protrude from the back surface of the light absorbing layer;
(2) providing a second assembly comprising an optically clear highly conformable layer comprising a first surface or having a front surface and a back surface, said back surface having a textured finish, a molding layer having a front surface and a back surface wherein the front surface of the molding layer has a textured finish and is in contact with the back surface of the conformable layer, and the back surface of the molding layer is in contact with a removable substrate;
(3) laminating the back surface of the microsphere containing layer of the first assembly to the front surface of the optically clear highly conformable layer of the second assembly; (4) removing the second removable substrate and molding layer whereby the conformed layer remains on the microspheres, follows the curved surfaces of the microspheres and is substantially uniform and the back surface of conformed layer has a textured finish.

In another method, the light transmitting filter of the invention can be prepared by the steps of: (1) providing a first construction comprising a molding layer having a front surface and a back surface, a first removable support layer on the back surface of the molding layer, and an optically clear polymeric layer on the front surface of the molding layer wherein the optically clear polymeric layer has a front surface and a back surface, and the back surface is textured, and wherein the Vicat softening point of the optically clear polymeric layer is greater than the Vicat softening point of the molding layer, (2) providing a second construction comprising a light absorbing layer having a first surface and a second surface, and a second removable support layer on the front surface of the light absorbing layer, (3) heat laminating the front surface of the optically clear polymeric layer of the first construction to the back surface of the light absorbing layer of the second construction, (4) removing the first removable support layer and the molding layer from the laminate, whereby the back surface of the conformed layer has a textured finish, provided that either the first construction or the second construction contains transparent microspheres, and the transparent microspheres form light tunnels through the light absorbing layer.

Figure 1B:
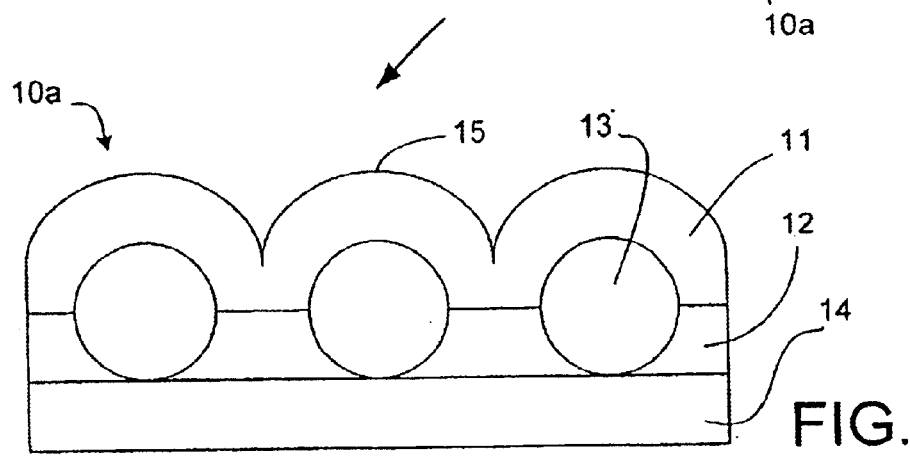
Figure 1C:
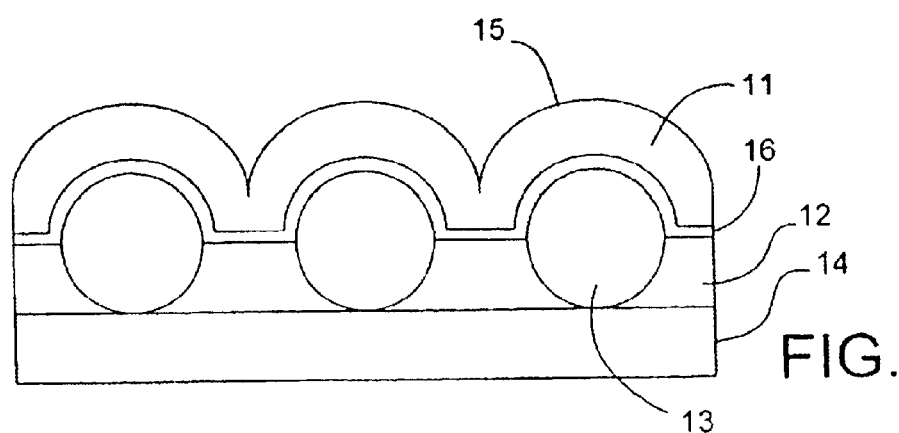
FIG. 1c is a cross sectional view of another filter of the invention.

The invention may be further understood by reference to the attached figures. FIG. 1a is a cross section of light filter 10. Box 10a is expanded in FIG. 1b to show a conformable coating 11, light absorbing layer 12, transparent microspheres 13 and clear support layer 14. The back surface of the conformed layer 11 has a textured surface 15. FIG. 1c represents another embodiment where conformable coating 11 is attached to tie layer or corona treatment layer 16. The light filter still contains light absorbing layer 12, transparent microspheres 13, a clear support layer 14, and the exposed back surface 15 of the conformed layer 11 has a textured finish.

FIGS. 2a–2e illustrate one method for preparing the light filters of the invention. In these figures, the top of each construction is sometimes referred to as the "front" and the bottom is sometimes referred to as the "back" of the construction. Accordingly the surface of each layer closest to the top or front of the construction is referred to as the "upper surface" or the "front surface" and the surface of each layer closest to the bottom or back of the construction is referred to as the "back surface" or the "lower surface". In use, the light enters the filters of the invention from the back surface, and the light is emitted from the front surface.

Figure 2A:
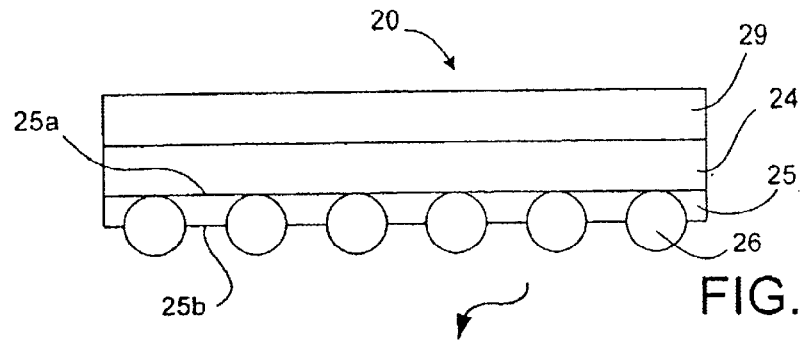
FIGS. 2a–2c are cross sectional views illustrating one method of preparing the light transmitting filters of the invention.
Figure 2B:
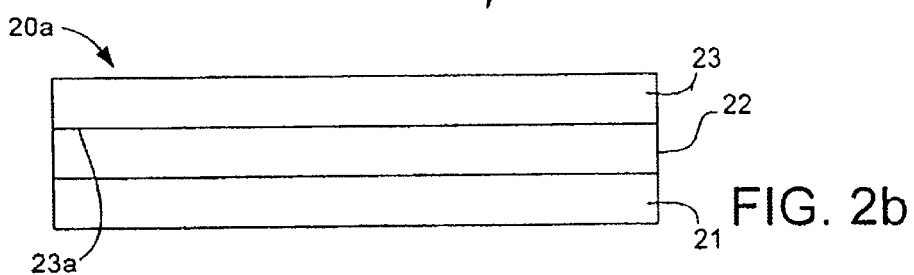

In FIG. 2a, construction 20 comprises a removable support layer 29 (typically paper or a PET film), an optically clear support layer 24, (e.g., a polyacrylate) and a light absorbing layer 25 (e.g., polyvinylbutyral or a thermoplastic polyurethane containing carbon black). Microspheres 26 are embedded in the light absorbing layer 25. A portion of the microspheres is embedded in the light absorbing layer 25 and contacts or perforates the front surface 25a of light absorbing layer 25. A portion of the microspheres 26 protrudes from the back surface 25b of the light absorbing layer 25. The construction 20a of FIG. 2b comprises substrate layer 21 (typically paper or a PET film such as Mylar®), molding layer 22 and conformable layer 23. The back (lower) surface 23a of conformable layer 23 has a textured finish. In another embodiment, molding layer 22 is omitted, and the surface of substrate layer 21 has a textured surface (for example, a release liner with a matte finish on the release surface) which is transferred to the back surface 23a of layer 23 when laminated thereto.

Figure 2C:
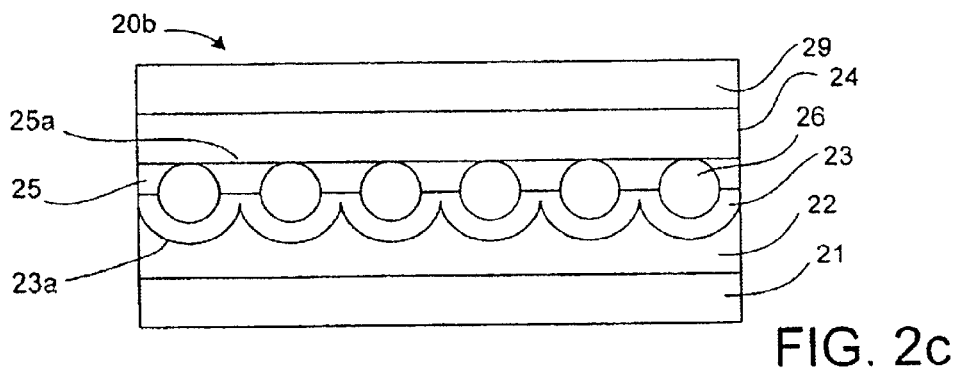
Figure 2D:
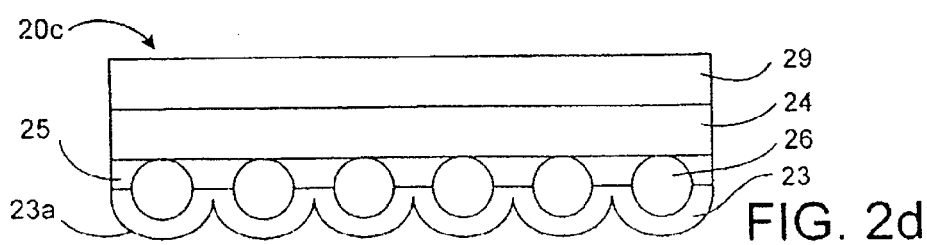

The construction 20b in FIG. 2c is formed by laminating construction 20 to construction 20a as shown. The lower (back) surface of the light absorbing layer 25 with protruding microspheres 26 is laminated to the upper surface of conformable layer 23 whereby the microspheres 26 are forced into the conformable layer 23, and the material of layer 23 conforms to the shape of the protruding microspheres 26. The molding layer 22 supports the moldable layer keeping the coating from leveling between the microspheres, and the textured surface 23a on the back surface of the conformable layer remains substantially intact. Lamination temperatures and pressures depend on the materials (polymers) used in the various layers, but, generally, lamination occurs at a temperature of from about 175° (79° C. to about 400° F. (204° C.), or from about 250° F. (121° C.) to about 350° F. (177° C.). The lamination pressure is preferably between about 50 to about 150 psi, or from about 75 to about 125 psi. In some embodiments the temperature applied to the bottom of layer 21 of construction 20a is higher than the temperature applied to the top of layer 29 of construction 20 when the two constructions are laminated together.

Figure 2E:
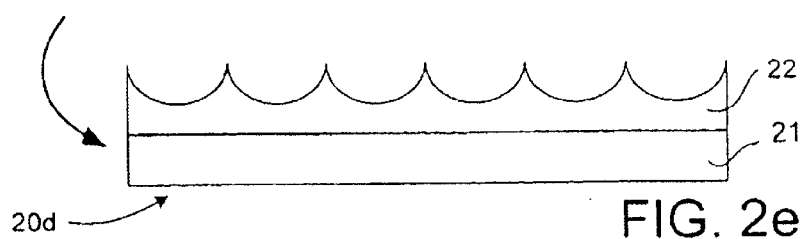

After lamination, as shown in FIG. 2c, the conformable layer 23 is now conformed to the shape of the microspheres 26. Also, the molding layer 22 has been correspondingly deformed by the entry of the microspheres 26 into the conformable layer 23. The construction 20c is allowed to cool, and the microtextured molding layer 22 and support layer 21 are removed as shown in FIG. 2e leaving the laminated construction (light filter) shown in FIG. 2d comprising removable support layer 29, optically clear support layer 24, microspheres 26 embedded in light absorbing layer 25 and contacting or perforating the front surface of the light absorbing layer forming a light transmitting tunnel through the light absorbing layer 25. The microspheres 26 and the light absorbing layer 25 between the microspheres 26 are coated with a conformed layer of optically clear material 23, and the back surface 23a of the conformed layer 23 has a textured finish. Removable support layer 29 is present to provide support during the manufacture and processing of the construction, and to provide some protection to the optically clear support layer 24 from the laminating temperatures. Accordingly support layer 24 is typically removed before the light filter is used.

Figure 3A:
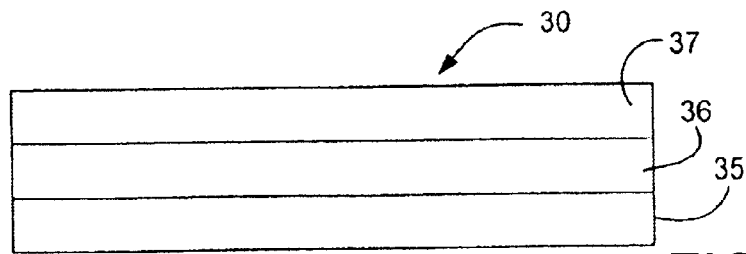
FIGS. 3a–3c are cross sectional views illustrating another method of preparing the light transmitting filters of the invention.
Figure 3B:
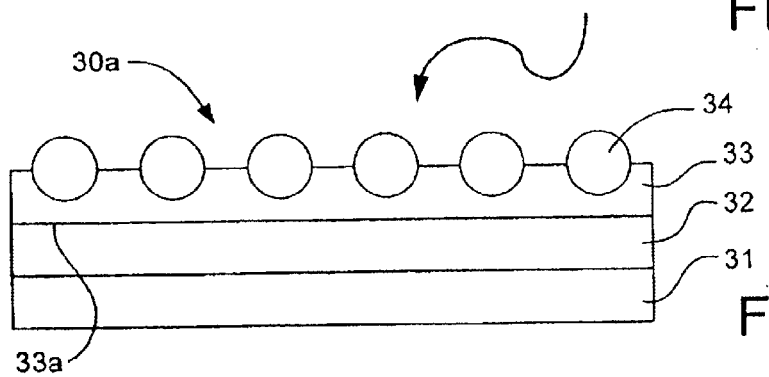
Figure 3C:
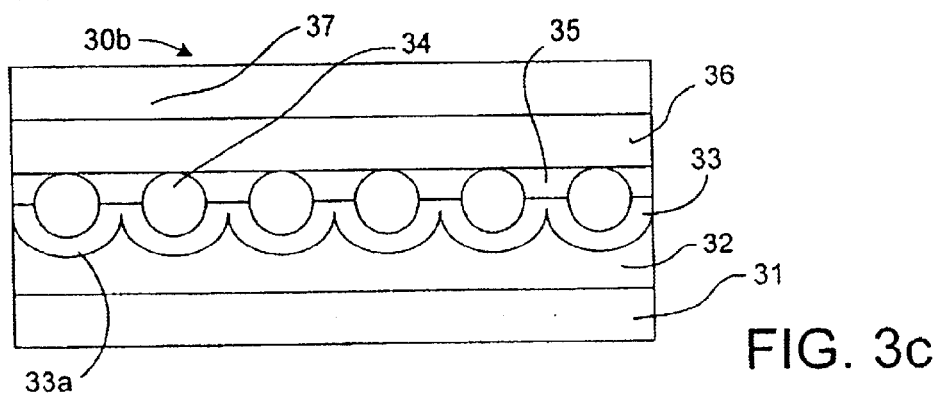

FIGS. 3a–3e illustrate another method of preparing the light filters of the invention. Construction 30 of FIG. 3a comprises a light absorbing layer 35, clear support layer 36 (e.g., a polyacrylate) and removable support layer 37 (e.g., paper or PET film). Construction 30a in FIG. 3b comprises support layer 31, molding layer 32 laminated to layer 33 which is composed of the conformable materials for the conformed layer. Microspheres 34 are embedded in the conformable layer 33, and the back surface 33a of conformable layer 33 has a textured surface. Constructions 30 and 30a are brought together, as shown, by laminating under heat and pressure as described above. FIG. 3c represents the multilayer construction formed when constructions 30 and 30a have been combined. The multilayer construction of FIG. 3b comprises support layer 31, molding layer 32, conformed layer 33, light absorbing layer 35, optically clear support layer 36 and removable support layer 37, The microspheres 34 are now embedded in the light absorbing layer 35 and in the conformed layer 33. As a result of the lamination process, a portion of the microspheres 34 contact and/or perforate the upper or front surface of the light absorbing layer thus creating a tunnel through the light absorbing layer 35. The conformable layer 33 of FIG. 3b is now a conformed layer 33 around a portion of the microspheres 34. The upper surface of molding layer 32 has been deformed by the lamination process as shown in FIG. 3c.

Figure 3D:
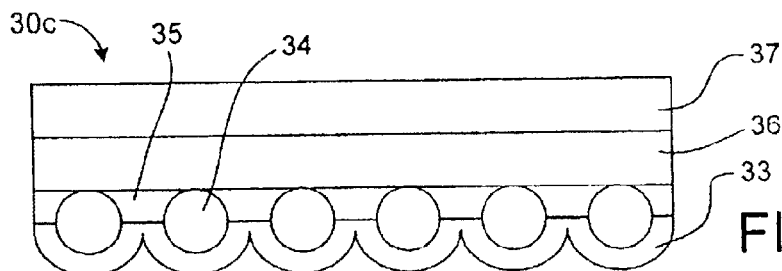
Figure 3E:
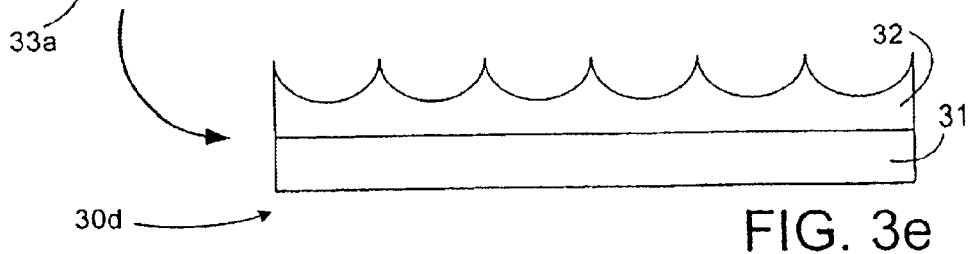

FIG. 3d illustrates the light filter of the present invention when the support layer 31 and molding layer 32 are removed from the construction of FIG. 3c as shown in FIG. 3e. The remaining portion of the construction 30c in FIG. 3d comprises removable support layer 37, clear support layer 36, light absorbing layer 35 and conformed layer 33 with the microspheres 34 embedded in the light absorbing layer 35 and coated with the conformed layer 33. The microspheres 34 contact or perforate the front surface of the light absorbing layer 35 forming a light transmitting tunnel through the light absorbing layer 35. The back surface 33a of the conformed layer 33 has a textured finish. Removable support layer 37 is present to provide support during the manufacture and processing of the construction, and to provide some protection to the optically clear support layer of polymethyl methacrylate. Thus, the removable polyethylene terephthalate support layer is removed from the polymethyl methacrylate layer to provide a light filter with a conformable coating having a textured (matte) surface on the back (exposed) side of the conformed layer.

The following are examples of the preparation of the light filters of the invention. These examples are illustrative and are not to be considered limiting to the scope of the invention. Unless otherwise indicated in the examples and elsewhere in the specification and claims, temperatures are in degrees centigrade, parts and percentages are by weight, and pressure is at or near atmospheric pressure.

EXAMPLE 1

A 75 micron (3 ml) layer of polyethylene terephthalate (SH-71 Polyester film from SKC America) is laminated to a 75 micron (3 mil) layer of polymethylmethacrylate. (Acrylic HI-7 from ICI). A 10 micron (0.4 mil) layer of black polyvinyl butyral (Butvar B-90 from Solutia containing 6% carbon black) is placed on top of the polymethylmethacrylate. Glass microspheres having a refractive index of 1.80 and having an average diameter of 52 microns are embedded into the polyvinylbutyral forming a light tunnel to make construction 1. A paper facestock coated with low density polyethylene and having a matte surface is obtained (e.g., Felix Schoeller Technical Paper F315L), and onto the layer of polyethylene (matte surface) is coated a 10 micron (0.4 mil) thick layer of clear polyvinylbutyral (Butvar B-90 from Solutia) to make construction 2. Construction 1 and 2 are pressed together (black polyvinylbutyral layer with exposed microspheres of construction 1 to the clear polyvinylbutyral layer of construction 2) at a temperature of 285° F. (140° C.) and 100 psi using a roll laminator. The layer of conformable clear polyvinylbutyral conforms around the protruding microspheres and the polyethylene layer (molding layer having a lower Vicat softening temperature than the polyvinylbutyral) helps form the conformable layer to the surface of the microspheres. After cooling, the paper and the low density polyethylene are separated from the other materials to provide a light filter with a conformable coating having a textured (matte) surface on the back (exposed) side of the conformed layer. The removable polyethylene terephthalate support layer is subsequently removed from the polymethylmethacrylate layer.

EXAMPLE 2

A paper facestock coated with low density polyethylene and having a matte finish such as Felix Schoeller Technical Paper F315L is coated with 0.4 mil (10 microns) of polyvinyl butyral (Butvar B-90), and the glass microspheres of Example 1 are embedded into the polyvinyl butyral layer. A second construction is prepared which comprises a 75 micron (3 mil) layer of polyethylene terephthalate (SH-71 from SKC America) coated with 75 microns (3 mils) of polymethylmethacrylate (MI-7 from Rohm & Haas) and 10 microns (0.4 ml) of black polyvinyl butyral (Butvar B-79 containing 6% carbon black). These two constructions are combined by laminating the exposed layer of black polyvinylbutyral to the layer of clear polyvinylbutyral containing the glass microspheres. Lamination is accomplished at a pressure of about 100 psi and at a temperature of about 285° F. (140° C.). After cooling, the paper and polyethylene layers are removed thereby exposing the back surface of the conformed layer of clear polyvinyl butyral having a textured finish on the back surface. When the light filter is ready to be used, the polyethylene terephthalate support layer is removed.

EXAMPLE 3

This example illustrates a light filter of the present invention which does not include an optically clear support layer as present in Examples 1 and 2 above. A first construction is prepared comprising a 75 micron layer of polyethylene terephthalate and 10 microns of a black thermoplastic polyurethane P-9827 from Morton containing 6% carbon black. A second construction is prepared which comprises a paper coated with 35 microns of low density polyethylene having a matte finish on the exposed surface followed by coating with a 10 micron layer of clear polyvinylbutyral. Glass microspheres of Example 1 are then embedded into the polyvinylbutyral. The two constructions are then laminated together by bringing the layer of clear polyvinylbutyral into contact with the layer of black polyurethane whereby the exposed microspheres are embedded in the thermoplastic urethane layer to the extent that the microspheres touch and/or perforate the surface of the black polyurethane layer which is in contact with the polyethylene terephthalate layer thereby forming a light tunnel through the black polyurethane layer. Lamination is accomplished at about 100 psi while maintaining the temperature on the outside of construction 1 (the paper layer) at about 135° C. (275° F.), and the temperature on the outer layer (polyethylene terephthalate) of construction 2 at about 95° C. (203° F.). After cooling the laminated structure, the paper and polyethylene layers are removed leaving a conformed layer of clear polyvinylbutyral in contact with the microspheres, and the back surface of the conformed clear polyvinylbutyral has a matte finish. The removable polyethylene terephthalate layer can then be removed to provide a light filter with the desired conformable coating having a textured surface. The light filter of this example may be adhered to a rigid structure, such as a sheet of polycarbonate (Lexan) or polymethyl methacrylate (Plexiglas).

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of preparing a light transmitting filter comprising the steps of:
   (1) providing a first assembly comprising a light absorbing layer having a front surface and a back surface wherein the front surface is adhered to a substrate, and a monolayer of transparent microspheres embedded in the light absorbing layer; wherein the microspheres provide light tunnels through the light absorbing layer and protrude from the back surface of the light absorbing layer (2) providing a second assembly comprising an optically clear conformable layer comprising a front surface and a back surface, said back surface having a textured finish, a molding layer having a front surface and a back surface wherein the front surface of the molding layer has a textured finish and is in contact with the back surface of the conformable layer, and the back surface of the molding layer is in adherent contact with a substrate;

(3) laminating the back surface of the microsphere containing layer of the first assembly to the front surface of the optically clear conformable layer of the second assembly;

(4) removing the molding layer and substrate whereby the conformed layer remains on the microspheres, and the back surface of conformed layer has a textured finish.

2. The method of claim 1 wherein the substrate of the first assembly is removed from the filter.

3. The method of claim 1 wherein the substrate of the first assembly comprises an optically clear substrate.

4. The method of claim 1 wherein the substrate of the first assembly is multilayered.

5. The method of claim 1 in which the Vicat softening point of the molding layer is less than the Vicat softening point of the optically clear conformable layer.

6. The method of claim 1 in which the light absorbing layer has a thickness of from about 10% to about 80% of the microsphere diameter.

7. The method of claim 1 in which the transparent microspheres which provide light tunnels through the light absorbing layer cover from about 60% to about 90% of the back surface of the light absorbing layer.

8. The method of claim 1 in which the transparent microspheres have a refractive index of from about 1.4 to about 2.3.

9. The method of claim 1 in which the transparent microspheres have an average diameter of from about 25 to about 300 microns and vary in diameter through a range of less than 50% of the average diameter of the microspheres.

10. The method of claim 1 wherein the conformable layer comprises a polyacrylate or a polyvinyl acetal.

11. A method of preparing a light transmitting filter comprising the steps of:
(1) providing a first assembly comprising a light absorbing layer having a front surface and a back surface wherein the front surface is adhered to a substrate;
(2) providing a second assembly comprising an optically clear conformable layer comprising a front surface and a back surface, said back surface having a textured finish, a molding layer having a front surface and a back surface wherein the front surface of the molding layer has a textured finish and is in contact with the back surface of the conformable layer, a monolayer of transparent microspheres embedded in the front surface of the optically clear polymeric layer, and the back surface of the molding layer is in adherent contact with a substrate;
(3) laminating the back surface of the light absorbing layer of the first assembly to the microsphere containing front surface of the optically clear conformable layer of the second assembly, wherein the microspheres provide light tunnels through the light absorbing layer and protrude from the back surface of the light absorbing layer;

(4) removing the molding layer and substrate whereby the conformed layer remains on the microspheres, and the back surface of conformed layer has a textured finish.

12. The method of claim 11 wherein the substrate of the first assembly is removed from the filter.

13. The method of claim 11 wherein the substrate of the first assembly comprises an optically clear substrate.

14. The method of claim 11 wherein the substrate of the first assembly is multilayered.

15. The method of claim 11 in which the Vicat softening point of the molding layer is less than the Vicat softening point of the optically clear conformable layer.

16. The method of claim 11 in which the light absorbing layer has a thickness of from about 10% to about 80% of the microsphere diameter.

17. The method of claim 11 in which the transparent microspheres which provide light tunnels through the light absorbing layer cover from about 60% to about 90% of the back surface of the light absorbing layer.

18. The method of claim 11 in which the transparent microspheres have a refractive index of from about 1.4 to about 2.3.

19. The method of claim 11 in which the transparent microspheres have an average diameter of from about 25 to about 300 microns and vary in diameter through a range of less than 50% of the average diameter of the microspheres.

20. The method of claim 11 wherein the conformable layer comprises a polyacrylate or a polyvinyl acetal.

21. A method of preparing a light transmitting filter comprising the steps of:
(1) providing a first construction comprising a molding layer having a front surface and a back surface, a first support layer on the back surface of the molding layer, and an optically clear polymeric layer on the front surface of the molding layer wherein the optically clear polymeric layer has a front surface and a back surface, and the back surface is textured, and wherein the Vicat softening point of the optically clear polymeric layer is greater than the Vicat softening point of the molding layer,
(2) providing a second construction comprising a light absorbing layer having a first surface and a second surface, and a second support layer on the front surface of the light absorbing layer,
(3) heat laminating the front surface of the optically clear polymeric layer of the first construction to the back surface of the light absorbing layer of the second construction,
(4) removing the first support layer and the molding layer from the laminate, whereby the back surface of the conformed layer has a textured finish, provided that either the first construction or the second construction contains transparent microspheres, and the transparent microspheres form light tunnels through the light absorbing layer.

22. The method of claim 21 wherein the second construction also comprises an optically clear layer between the fight absorbing layer and the second support layer.

23. The method of claim 21 wherein the support layer of the second construction comprises an optically clear layer.

24. The method of claim 21 wherein the support layer of the second construction is removed from the filter.

25. The method of claim 21 wherein the support layer of the second construction is multilayered.

26. The method of claim 21 wherein the molding layer comprises a polyolefin, and the first support layer is a paper or a polymeric liner.

27. The method of claim 21 wherein the light absorbing layer comprises a polyacrylate, a polyvinyl acetal or a thermoplastic polyurethane and at least one pigment or colorant.

28. The method of claim 21 wherein the transparent microspheres are embedded in the light absorbing layer of the second construction.

29. The method of claim 21 wherein the transparent microspheres are embedded in the optically clear polymeric layer of the first construction.

30. The method of claim 21 wherein the transparent microspheres are glass.

31. The method of claim 21 wherein the transparent microspheres have an average diameter of from about 25 to about 300 microns.

32. The method of claim 21 wherein the microspheres have a refractive index of from about 1.4 to about 2.3.

33. The method of claim 21 wherein the light absorbing layer has a thickness of from about 10% to about 80% of the diameter of the microspheres.

34. A method of preparing a light transmitting filter comprising the steps of:
  (1) providing a first construction comprising a molding layer having a front surface and a back surface, a first support layer on the back surface of the molding layer, and an optically clear polymeric layer on the front surface of the molding layer wherein the optically clear polymeric layer has a front surface and a back surface, and the back surface is textured,
  (2) providing a second construction comprising a light absorbing layer having a first surface and a second surface, and a second support layer on the front surface of the light absorbing layer,
  (3) heat laminating the front surface of the optically clear polymeric layer of the first construction to the back surface of the light absorbing layer of the second construction,
  (4) removing the first support layer and the molding layer from the laminate, whereby the back surface of the conformed layer has a textured finish, provided that either the first construction or the second construction contains transparent microspheres, and the transparent microspheres form light tunnels through the light absorbing layer.

35. The method of claim 34 wherein the second construction also comprises an optically clear layer between the light absorbing layer and the second support layer.

36. The method of claim 34 wherein the support layer of the second construction comprises an optically clear layer.

37. The method of claim 34 wherein the support layer of the second construction is removed from the filter.

38. The method of claim 34 wherein the support layer of the second construction is multilayered.

39. The method of claim 34 wherein the molding layer comprises a polyolefin, and the first support layer is a paper or a polymeric liner.

40. The method of claim 34 wherein the light absorbing layer comprises a polyacrylate, a polyvinyl acetal or a thermoplastic polyurethane and at least one pigment or colorant.

41. The method of claim 34 wherein the transparent microspheres are embedded in the light absorbing layer of the second construction.

42. The method of claim 34 wherein the transparent microspheres are embedded in the optically clear polymeric layer of the first construction.

43. The method of claim 34 wherein the transparent microspheres are glass.

44. The method of claim 34 wherein the transparent microspheres have an average diameter of from about 25 to about 300 microns.

45. The method of claim 34 wherein the microspheres have a refractive index of from about 1.4 to about 2.3.

46. The method of claim 34 wherein the light absorbing layer has a thickness of from about 10% to about 80% of the diameter of the microspheres.

* * * * *